United States Patent
Haskin et al.

(10) Patent No.: US 9,318,936 B2
(45) Date of Patent: Apr. 19, 2016

(54) ALTERNATOR STATOR LEAD AND TERMINAL INSULATOR ASSEMBLY

(75) Inventors: Casey Haskin, Reno, NV (US);
Alejandro Arenas, Reno, NV (US)

(73) Assignee: ROMAINE ELECTRIC, Kent, WA (US)

( * ) Notice: Subject to any disclaimer, the term of this patent is extended or adjusted under 35 U.S.C. 154(b) by 0 days.

(21) Appl. No.: 13/188,425

(22) Filed: Jul. 21, 2011

(65) Prior Publication Data

US 2012/0019086 A1     Jan. 26, 2012

Related U.S. Application Data

(60) Provisional application No. 61/366,524, filed on Jul. 21, 2010.

(51) Int. Cl.
| | |
|---|---|
| H02K 11/00 | (2006.01) |
| H02K 15/00 | (2006.01) |
| H02K 11/04 | (2006.01) |
| H02K 3/50 | (2006.01) |
| H02K 5/22 | (2006.01) |

(52) U.S. Cl.
CPC ............... *H02K 11/046* (2013.01); *H02K 3/50* (2013.01); *H02K 5/225* (2013.01); *Y10T 29/49009* (2015.01)

(58) Field of Classification Search
CPC ......... H02K 3/50; H02K 5/225; H02K 11/00; H02K 11/046; H02K 15/00
USPC ............... 310/71, 54, 68 D, 68 R, 89; 29/596
IPC ............................................. H02K 11/00, 15/00
See application file for complete search history.

(56) References Cited

U.S. PATENT DOCUMENTS

| | | | | |
|---|---|---|---|---|
| 3,831,047 | A * | 8/1974 | Sokol et al. | 310/68 R |
| 3,895,247 | A * | 7/1975 | Iwata et al. | 310/68 D |
| 4,262,224 | A * | 4/1981 | Kofink et al. | 310/54 |
| 4,835,427 | A * | 5/1989 | Bohm et al. | 310/68 D |
| 4,952,829 | A * | 8/1990 | Armbruster et al. | 310/68 D |
| 6,327,128 | B1 * | 12/2001 | De Petris | 361/103 |
| 6,621,703 | B2 * | 9/2003 | De Petris | 361/704 |
| 6,628,023 | B1 * | 9/2003 | Paquet | 310/71 |
| 6,731,030 | B2 * | 5/2004 | Keidar et al. | 310/68 D |
| 6,825,586 | B2 | 11/2004 | Edrington | |
| 7,385,323 | B2 * | 6/2008 | Takahashi et al. | 310/71 |
| 7,501,729 | B2 * | 3/2009 | Takeuchi | 310/71 |
| 7,633,198 | B2 | 12/2009 | Kirkman et al. | |
| 2002/0041476 | A1 * | 4/2002 | Petris | 361/103 |
| 2003/0042808 | A1 * | 3/2003 | Keidar | H02K 11/046 310/68 D |
| 2004/0256936 | A1 * | 12/2004 | Takahashi | H02K 3/38 310/91 |
| 2005/0034294 | A1 * | 2/2005 | Edrington | 29/596 |
| 2006/0017337 | A1 * | 1/2006 | Smith | H02K 11/046 310/68 D |
| 2006/0091746 | A1 * | 5/2006 | Takeuchi | 310/71 |

(Continued)

*Primary Examiner* — John K Kim
(74) *Attorney, Agent, or Firm* — John D. Long, Esq; Long & Chybik (57) ABSTRACT

One possible embodiment could be a stator lead and terminal insulator assembly for use in an alternator comprising of a top plate having a top surface and a bottom surface that converge to further define both an outside edge and an inside edge, the outside edge meeting the inside edge; a flange that connects to the outside edge of the top plate; and a plurality of terminal apertures penetrating the top plate, each terminal aperture being capable of reversibly receiving a respective terminal from a lead connected to the windings of a multi-phase stator of the alternator.

17 Claims, 4 Drawing Sheets

(56) References Cited

U.S. PATENT DOCUMENTS

| | | | |
|---|---|---|---|
| 2006/0208584 A1* | 9/2006 | Kirkman et al. | 310/71 |
| 2008/0265700 A1* | 10/2008 | Bradfield et al. | 310/64 |
| 2012/0013310 A1* | 1/2012 | Clark et al. | 323/204 |

\* cited by examiner

ALTERNATOR STATOR LEAD AND TERMINAL INSULATOR ASSEMBLY

CROSS-REFERENCES TO RELATED APPLICATIONS

This application claims the benefit under 35 U.S.C. §119 (e) of U.S. Provisional Patent Application No. 61,366,524, filed on Jul. 21, 2010, the contents of which are relied upon and incorporated by reference.

STATEMENT REGARDING FEDERALLY SPONSORED RESEARCH OR DEVELOPMENT

Not Applicable

REFERENCE TO A "MICROFICHE APPENDIX"

Not Applicable.

1. Field of the Invention

The present invention relates to field of automotive alternators. More particularity, the invention relates to insulator assemblies for stator leads and terminals of automotive alternators.

2. Background

Alternators are those devices that generally take at least some of the mechanical power (e.g., as supplied by an automotive engine) and convert it to electrical power (e.g., to charge a battery and otherwise power the vehicle's electrical system when the vehicle's engine is running) An automotive alternator may substantially comprise of a rotating permanent magnet/electromagnet known as rotor, which spins within a hollow, double open-ended interior of a stator (e.g., a stationary set of insulated wires or conductors wound in coils [e.g., stator windings] around a tube-shaped frame.) The stator/rotor combination is generally encapsulated within a hollow casing that defines the outside of the alternator.

As the mechanical action (e.g., of the automotive engine) directly or indirectly causes the rotor to spin within the stator, it moves a magnetic field relative to the windings. As the magnetic field cuts across (e.g., rotates poles) relative to the stator windings, this action creates or induces an electrical (e.g., alternating) current (e.g., also known as AC) in the stator windings. The AC or alternating current then passes from the windings to a bridge rectifier (or like device) to convert the alternating current into direct current (e.g., also known as DC) which is used to charge the vehicle's battery and power its electrical system(s).

Each of the stator windings may end in a respective stator leads. These stator leads, which substantially carry the created AC away from the respective stator windings, may comprise of various types of flexible electrical conductors, such as single strand or multiple strand metallic wire that is substantially covered by an insulating (e.g., fiberglass) sleeve. A respective non-stator end of each stator lead may end in a terminal (that connects the lead to the rectifier.)

The casing for the alternator may comprise of a cylindrically-shaped housing sandwiched between and sealed by a rectifier end cover and drive end cover. The drive end cover may further comprise of bearings, oil seal and the like that connect to one end of the rotor to allow the end to movably rotate in the drive end cover as well as pass through to connect appropriately with the engine (e.g., substantially allowing the engine to power the rotation of the rotor between the stator, creating electricity.) The rectifier end cover may also have bearings, oil seals and the like in which allow the other end of the rotor to be movably connect to the rectifier end cover and further facilitate the rotor's movement within the stator. The rectifier end cover may further feature a rectifier connected the terminals to change the created current from AC-DC. In heavy duty automotive applications, where the current generation by the alternator causes a high heat output, the alternator is generally not an open-unit cooled by air/fan rather it may have a sealed housing that is cooled by lubricating oil from the engine.

As the rectifier end is connected to the terminals during assembly/rebuilding of the alternator, several insulators may be fitted to the terminals as needed when the terminals are inserted into terminal receptacles of the rectifier end of the casing (to connect the terminals to the rectifier) to prevent unwanted contact (leading to undesired grounding out of the circuit by direct electrical contact between the electrically-conductive housing and the terminals).

Prior to being fitted to the rectifier end, the terminals may be placed in a loose and movable manner in the alternator casing. This condition makes it harder to assemble and properly place the terminals into the rectifier end. Additionally, loose leads during alternator operation can vibrate and rub against various other alternator parts to lose some or all of their insulation leading to a potential grounding or shorting of the alternator circuit. One way to handle this issue was to connect the terminals to one or more insulating plates that respectively fit into the alternator housing in a manner that holds the terminals and their respective leads in suitable position to facilitate assembly and prevent unwanted contact of the leads with potentially damaging/grounding parts of the alternator.

One example of such a solution could be an insulating plate having a set of apertures fully penetrating both sides of the plate (an aperture being provided for each lead/terminal of the stator); a set of lead guides; and lead retention devices. In this manner, when the terminal was initially secured to the insulating plate by placing the terminal through its respective aperture, the lead retention devices (e.g., a tie or clip threaded through a hole in the plate) further holds the lead in place proximate to the plate, while guides (e.g., an open-topped channel) direct the lead to its respective aperture for its terminal. The combination of the insulating plate with connected lead/terminals can then sit at the end of the alternator housing and function to generally keeping the leads away from other parts of the alternator (e.g., moving and non-moving) while holding terminals appropriately spaced apart for easy insertion into the respective terminal receptacles of the rectifier end of the alternator.

Possible limitations to such a solution could include additional steps and expense in the rebuilding/building of alternators needed to tie/fasten each of the leads to the insulation plate could require. Further, under the alternator's operating conditions and stresses, these lead fasteners could break off, become involved in the machinery of the alternator and thereby impairing the operation and output performance of the alternator. Additionally, such insulation plates may be known to break if not handle properly during the insertion into an alternator during alternator rebuild/assembly.

What is needed therefore is a strengthened alternator stator lead and terminal insulator assembly that could hold the terminals in appropriate spacing respective for increasing the ease of insertion of the terminals into rectifier end/rectifier housing without the need for a separate lead fastener capability. Such an assembly could have an additional strengthening and insulating member that helps nestles the leads within the assembly to limit the leads/terminal movement and reduce the possibility of a potentially performance-interfering interaction with other portions of the alternator without the need for a lead fasteners. Such an assembly, in having reduced parts and installment steps, could provide a reduction of time, labor, and equipment costs for manufacture and/or rebuilding of heavy duty automotive alternators.

SUMMARY OF ONE EMBODIMENT OF THE INVENTION

Advantages of One or More Embodiments of the Present Invention

The various embodiments of the present invention may, but do not necessarily, achieve one or more of the following advantages:

to provides strengthening structure that both strengthens the assembly as well as provides addition insulation protection for the leads;

the ability to align and hold stator terminals into proper relationship for simultaneous insertion into receptacles of alternator rectifier;

to provide an alternator lead/terminal insulation plate that does not require a separate fasteners to hold the stator leads to the plate;

the ability to reduce costs, parts and labor in rebuilding heavy duty automotive alternators; and to provide alternator lead/terminal insulator assembly having a flange that moves the assembly and protected leads up and away from potentially damaging parts of the alternator.

These and other advantages may be realized by reference to the remaining portions of the specification, claims, and abstract.

Brief Description of One Embodiment of the Present Invention

One possible embodiment of the invention could be a stator lead and terminal insulator assembly for use in an alternator comprising of a axial end plate connected to a flange by the outside edge of the axial end plate; the axial end plate further being penetrated by a plurality of terminal apertures, each terminal aperture being capable of reversibly receiving a respective terminal from a lead connected to the windings of a multi-phase stator of the alternator.

Another possible embodiment of the invention could be an alternator comprising of a stator lead and terminal insulator assembly having a axial end plate and a flange, the top axial end plate having a top surface and a bottom surface that converge together to define both an outside edge and an inside edge that meet one another, the axial end plate being further penetrated by terminal apertures, the flange connects to the outside edge to further form with the axial end plate a lead protection area; a multiphase stator having windings that connect to leads, each lead ending in a terminal; a casing containing the stator, leads, and terminals, the casing further supporting a rectifier; wherein the terminals pass through their respective terminal apertures to protrude through the casing to connect to the rectifier while the leads nestle within the lead protection area.

Yet another possible embodiment of the invention could be a method for using an alternator stator terminal and lead insulation assembly comprising of the following steps, but not necessarily in the order shown, providing an alternator stator lead and terminal insulator assembly having an arcuate axial end plate being penetrated by a set of terminal apertures, the axial end plate further being perpendicularly connected along its convex outside edge to an edge of a flange, the flange further descends from the axial end plate to form a lead protection area; providing an alternator having a casing that can be accessed to reach a multiphase stator containing a rotor within, the windings of the stator connecting to leads with each lead ending in a terminal, the casing being capable of further supporting a rectifier that can connect to the terminals as they pass through the housing; and using the assembly to align the terminals so they can pass through casing.

The above-description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention 10 could comprise of an alternator stator lead and terminal insulator assembly 40 for a heavy-duty automotive alternator 12 and a method or process for applying the assembly 100. As substantially shown in FIGS. 1, 2, and 3, an alternator 12 could comprise of a casing 14 that could contain a multiphase stator 26 movably containing a rotor 24. The casing 14 could be comprised of a cylindrical housing 18 sandwiched between and enclosed by a drive end cover 16 and a rectifier end cover 20. The two end covers 16, 20 could rotatably support the rotor 24 within a multiphase stator 26, the stator 26 furthering having a plurality of insulated leads 28 connected to the windings of the stator 26. The rectifier end cover 20 could further feature receptacles 32 used for receiving the terminals 30, which allow the terminals 30 to connect to a rectifier 22 that is generally supported by the rectifier end cover 20.

Figure 1:
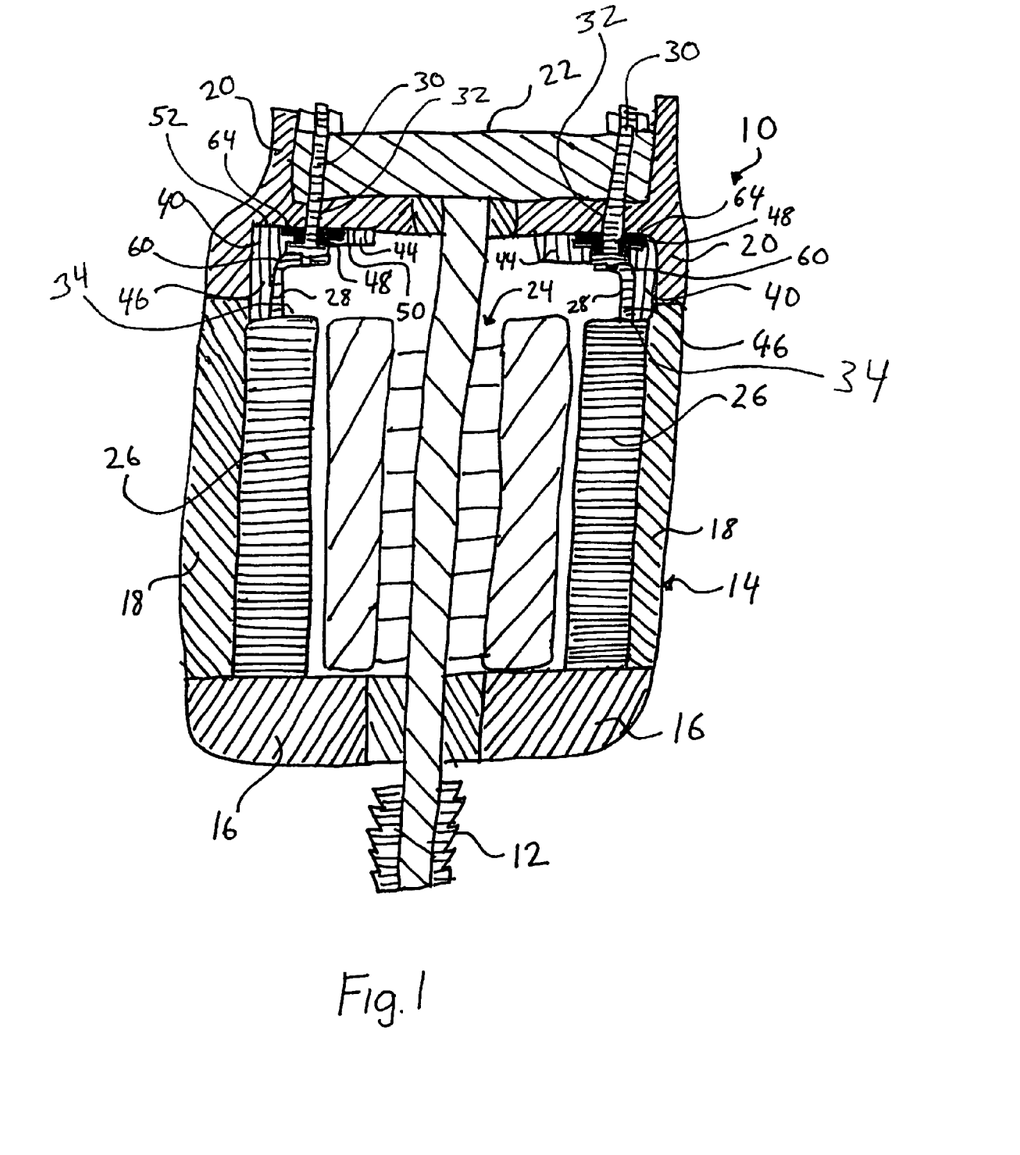
FIG. 1 is substantially a cutaway elevation view of one embodiment of alternator with invention of the present invention.
Figure 2:
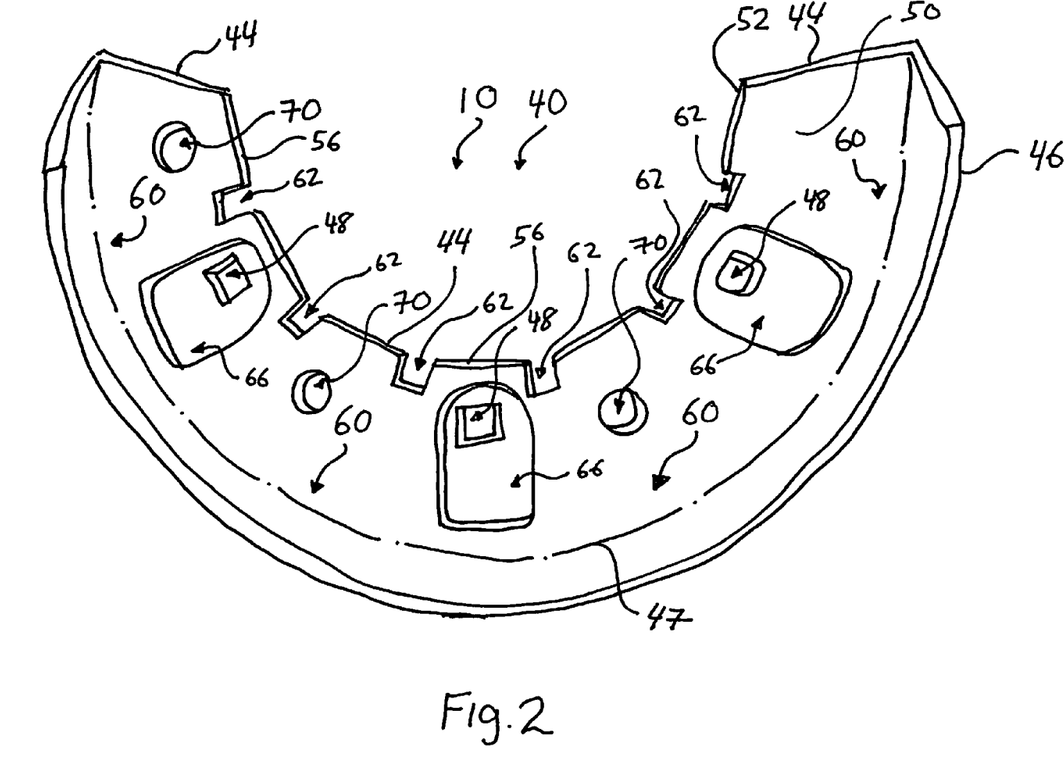
FIG. 2 is substantially a top view of one embodiment of insulator plate of the present invention.
Figure 3:
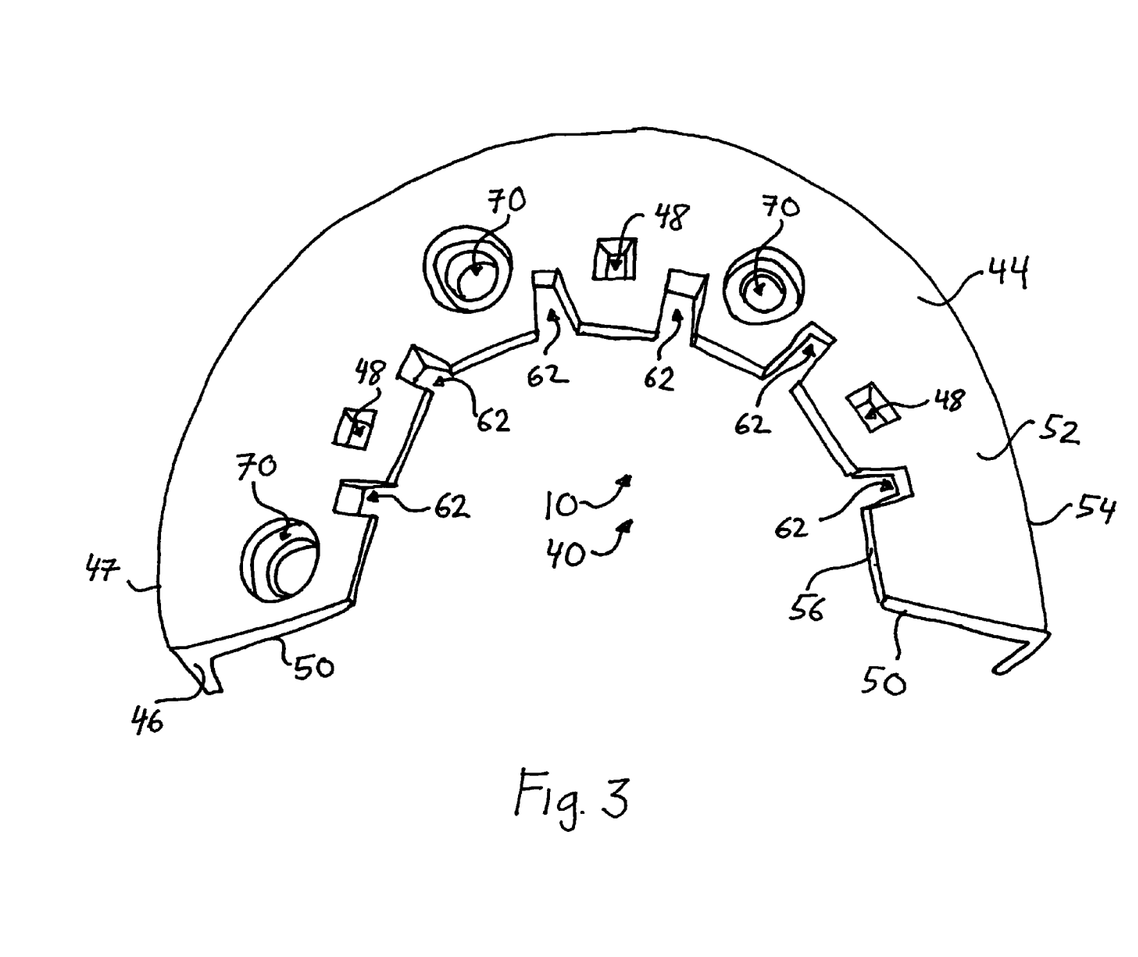
FIG. 3 is substantially a cutaway view of one embodiment of insulator plate of the present invention.

The insulation assembly 40 could be made of a suitable heat-resistant, electrically-resistant polymer that is generally rigid with some limited flexibility to allow for the ease of applying the terminal/lead insulation assembly 40 to the alternator 12. The assembly 40 could comprise of a raised skirt or flange 46 connected to a axial end plate 44. The axial end plate 44 may comprise of a top surface 52 and a bottom surface 50, both surfaces 50, 52 converging to generally define a convex curved outside edge 54 and a concave curved inside edge 56 the two edges 54, 56 meeting one another. In one embodiment, the inside edge 56 could have a concave curved shape while the outside edge 54 could have an convex curved shape to generally provide the axial end plate 44 with an overall arcuate or lunar shape. The outside edge 54 could also substantially have a greater circumference than the inside edge 56 if both edges 54, 56 were placed within a common radius. In at least one embodiment, the axial end plate 44 could be sufficiently wide enough to have the inside edge 56 form a series of gaps or notches 62 to accommodate the various interior alternator protrusions (not shown).

The axial end plate 44 could further comprise of a plurality of terminal apertures 48 that penetrate the axial end plate 44 to further continuously connect the top surface 52 with the bottom surface 50. The terminal apertures 48 could be sized to generally allow terminals 30 to pass through the assembly 40 to connect to the terminal receptacles 32 of rectifier 22. To carry out this purpose, the terminal apertures 48 could be generally shaped and sized to reversibly receive their respective terminals 30. In at least one version, they could be further additionally sized to receive terminals 30 to which respective insulating bushings 64 could have been attached.

The flange 46 could be continuously mounted by a flange edge 47 to the outside edge 54 in a curved fashion so that flange 46 is in substantially perpendicular orientation to the axial end plate 44. The flange 46 could be curved to follow the convex circumference of the outside edge 54 and could further project down and away from the axial end plate's bottom surface 50. The meeting of the flange 46 and the axial end plate's bottom surface 50 could create a lead protection area 60 against which leads 28 could be nestled against to keep them away and secured from other parts (e.g., moving) of the alternator 12.

The flange 46 could be of sufficient thickness to substantially add to the overall strength and rigidity of the axial end plate 44 to help it resist breakage during insertion and operations. The flange 46 could be of sufficient width (e.g., height) and length (the length that generally being equal to the length of the outside curve 54) to hold in (nestle) one or more of the leads 28 within the lead protection area 60 when the terminals 30 pass through their respective terminal apertures 48 (e.g., when the assembly 40 is located proximate to the rectifier end 34 of the stator 26.) The construction of the lead protection area 60 could be such that the nestling of the leads 28 does not require the use of clips, ties, or other fasteners to hold the leads 28 in place within the leads protection area 60.

The assembly 40 in one embodiment may further comprise of top-hat shaped bushings 64 in that the bushings 64 each have a cylindrical-shaped body with a raised rim radially projecting outward from one end of the bushing body. A set of two bushings 64 per terminal 30 could be applied to the terminal 30 as it is being fitted to the top plate 44 to further insulate the terminal 30 as it sits in the top plate 44. To further accommodate the insulated bushing 64 or a particular terminal shape, the surface proximate to the terminal aperture on the bottom surface 50 could be provided with a recessed area 66 to further accommodate the bushing's raised rim or particular shape of a portion of the terminal 30. In another version, the bushing 64 could just be one-piece cylindrical bushing that is applied to the terminal 30

In other possible embodiment, the terminal apertures 48 may further have aperture collars 68 (not shown) projecting up and away from the top surface 52. These aperture collars 68 may provide additional re-enforcement material to ensure the proper orientation of the terminals 30 passing through the axial end plate 44 to ensure their alignment to the terminal receptacles 32 of the rectifier 22. In other respects, the top surface 52 of the axial end plate 44 could be seen as generally being without other projections.

Depending on the configuration of the particular alternator 12, the assembly 40 may further feature a set of diode relief apertures 70 which also penetrate the top plate 44 to continuously connect the top surface 52 to the bottom surface 50. These diode relief apertures 70 may respectively accommodate portions of diodes and alike (not shown) of the rectifier 22.

The assembly 40 could be further designed to fit within the alternator 12 atop the rectifier end 34 of the of the multiple phase stator 26 wherein its outside edge 54 is proximate to the interior circumference of the alternator casing 14. The inside edge 56 should be so constructed that the assembly does not come in contact with the rotor 24 or otherwise impair the rotor's movement within the alternator 12.

Figure 4:
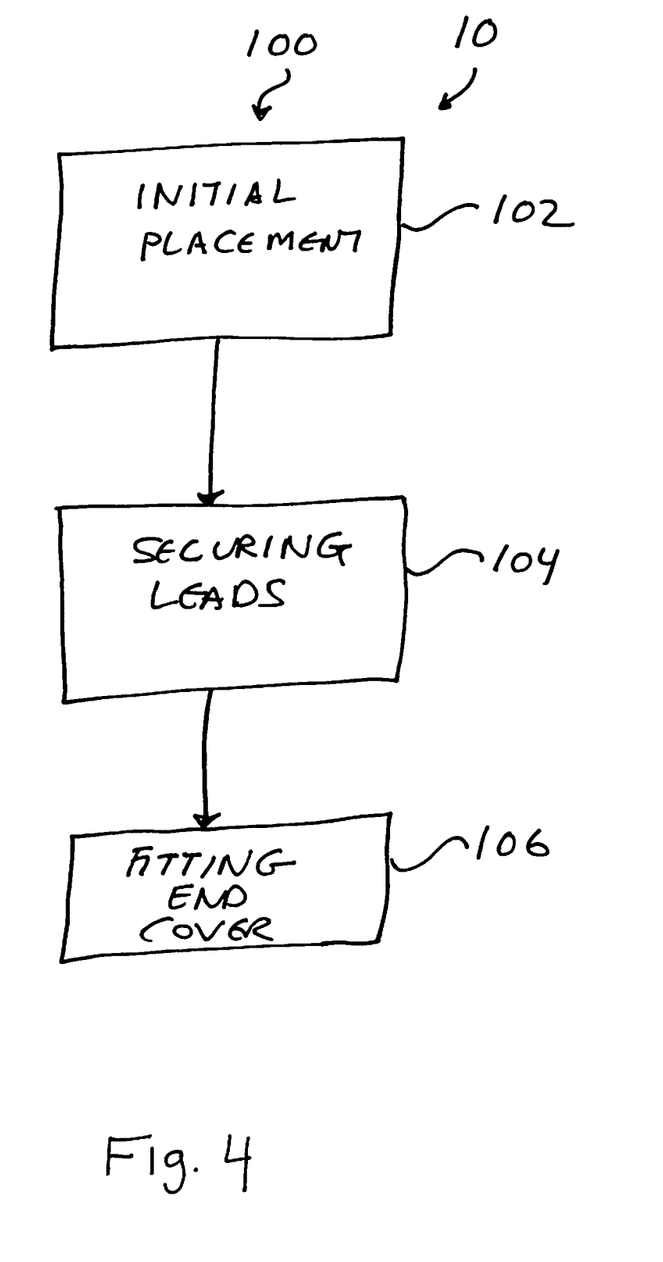
FIG. 4 is substantially a flow chart of one possible method or process for using the invention.

As substantially shown in FIG. 4, one possible method or process 100 of use of the assembly could start with step 102, commencing initial placement, wherein assembly and rectifier end cover could be brought proximate to the rectifier end of the stator with the remaining casing. This positioning allows the terminals to be placed into their respective terminal apertures in the top plate (with or without insulated bushings). After this step is completed, the process 100 could proceed to step 104, securing the leads.

In step 104, securing the leads, as the terminals are placed within their respective terminal apertures, the leads can be located within the lead protection area denoted by where the raised flange and bottom surface meet. In this manner, the leads could be nestled proximate to and protected by the axial end plate's bottom surface and protected by the flange. The flange can come in contact with the stator, substantially lifting the bottom surface of the axial end plate away from the stator. The outside edge could be generally aligned just within of the circumference of the interior of the casing while the inside edge is respectively clear of the rotor and rotor movement. At the substantial completion of step 104, the process 100 could proceed to step 106, fitting of the rotor end cover.

In this step 106, fitting of the rectifier end cap, the rectifier end cover could be moved proximate to the assembly. The proper positioning of the assembly along with mounted terminals that are properly spaced and oriented relative for delivery into receptacles of the rectifier allow the simultaneous placement of the terminals into rectifier end cover/the rectifier. At the same time, the leads are kept separate from other parts of the alternator to lessen the chance of an electrical short occurring between leads or between leads and other parts of the alternator. When terminals attached to the rectifier, the cover can be further lowered upon the housing to secure the rectifier end cover to the housing.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

As generally described herein the invention to provides an additional structure that both strengthens the assembly as well as provides addition insulation protection for the leads in a manner that does not require a separate fasteners to hold the stator leads to the plate and moves the assembly and protected leads up and away from potentially damaging parts of the alternator. The invention in not needing leads fasteners had the ability to reduce costs, parts and labor in rebuilding heavy duty automotive alternators.

What is claimed is:

1. A stator lead and terminal insulator assembly for use in a heavy-duty automotive alternator comprising:
   (A) an axial end plate having a top surface and a bottom surface that converge to further define both an outside edge and an inside edge, the inside edge further defining one or more notches;
   (B) a flange that connects along the entire outside edge of the axial end plate;
   (C) a plurality of terminal apertures penetrating the axial end plate, each terminal aperture being capable of receiving a respective terminal from a lead connected to windings of a multi-phase stator of the alternator;
   wherein the stator lead and terminal insulator assembly as placed in a casing is fully contained within the casing in that the stator lead and terminal insulator assembly lacks the capacity to penetrate the casing, the axial end plate and flange are made from electrically non-conductive material that allows the lead to rest against the flange in a manner that prevents unwanted electrical contact of the lead with the casing, the one or more notches being capable of receiving one or more portions of an interior of the alternator.

2. The insulator assembly of claim 1 wherein the flange has an edge that connects to the outside edge of the axial end plate.

3. The insulator assembly of claim 1 wherein the flange is curved along the outside edge.

4. The insulator assembly of claim 3 wherein the flange is curved in a convex fashion.

5. The insulator assembly of claim 1 wherein the flange descends from the bottom surface of the axial end plate.

6. The insulator assembly of claim 5 wherein the flange is oriented in a perpendicular fashion relative to the axial end plate.

7. The insulator assembly of claim 1 further comprising a set of diode relief apertures formed by the axial end plate, the set of diode relief apertures capable of receiving one or more portions of a rectifier of the heavy-duty automotive alternator.

8. A heavy-duty automotive alternator comprising:
   (A) an alternator stator lead and terminal insulator assembly having an axial end plate and a flange that are made from electrically non-conductive material, the axial end plate having a top surface and a bottom surface that converge together to define both an outside edge and an inside edge, the axial end plate being further penetrated by terminal apertures, the flange connects along the entire outside edge to further form with the axial end plate a lead protection area, the axial end plate further defining an inside edge with one or more notches;
   (B) a multiphase stator having windings that connect to leads, each lead contacted and connected to a respective terminal;
   (C) a casing, the casing supporting a rectifier and containing the multiphase stator, the leads, and the alternator stator lead and terminal insulator assembly, wherein the multiphase stator, the leads and the alternator stator lead and terminal insulator assembly do not penetrate the casing;
   wherein each terminal passes through a respective terminal aperture to protrude through the casing to connect to the rectifier while the leads nestle within the lead protection area to prevent the leads from making unwanted electrical contact with other parts of the alternator, the alternator stator lead and terminal insulator assembly as placed in the casing is fully contained within the casing in that the alternator stator lead and terminal insulator assembly lacks the capacity to penetrate into the casing, the one or more notches receive one or more portions of an alternator's interior.

9. The alternator of claim 8 wherein the flange descends from the axial end plate to form the lead protection area.

10. The alternator of claim 8 wherein the flange is oriented to be perpendicular to the axial end plate to form the lead protection area.

11. The alternator of claim 8 wherein the flange curves along the entire outside edge of the axial end plate to form the lead protection area.

12. The alternator of claim 11 wherein the curve of the flange is convex.

13. The alternator of claim 8 further comprising a set of diode relief apertures formed by the axial end plate, the set of diode relief apertures receiving one or more portions of the rectifier.

14. A method for using an alternator stator terminal and lead insulation assembly within an heavy-duty automotive alternator comprising the following steps, but not necessarily in the order shown:
   (A) providing an alternator stator lead and a terminal insulator assembly having an arcuate axial end plate made of an electrically non-conductive material and being penetrated by a set of terminal apertures, the axial end plate having a convex out edge and an inside edge, the inside edge further defining one or more notches, the axial end plate being further being perpendicularly connected along the entire convex outside edge to an edge of a flange made of the electrically non-conductive material, the flange further descends from the axial end plate to form a lead protection area, the terminal insulator assembly being fully contained within a casing in that the stator lead and the alternator terminal insulator assembly as placed in the casing is fully contained within the casing in that the stator lead and terminal insulator assembly lacks the capacity to penetrate into the casing;
   (B) providing an alternator having a casing that can be accessed to reach a multiphase stator containing a rotor within, the windings of the stator connecting to leads with each lead ending in a terminal, the casing being capable of further supporting a rectifier that can connect to the terminals as they pass through the casing;
   (C) passing the terminals through the respective terminal apertures;
   (D) using the assembly to align the terminals so they can pass through the casing;
   (E) receiving one or more portions of an alternator's interior within the one or more notches; and
   (F) nestling the leads within the lead protection area in a manner that prevent the leads from having unwanted electrical contact with other portions of the alternator.

15. The method of claim 14 wherein the nestling of the leads does not require using fasteners, clips, or ties to secure the leads within the lead protection area.

16. The method of claim 14 further comprising a step of lifting the leads up and away from the stator.

17. The method of claim 14 further comprising a step of receiving portions of the rectifier within a set of diode relief apertures formed by the axial end plate.

\* \* \* \* \*